March 1, 1938.  F. H. LE JEUNE  2,109,922
METHOD AND MACHINE FOR MANUFACTURING UNDERCUT SAND MOLDS
Filed May 11, 1936  2 Sheets-Sheet 1

FIG.I.

INVENTOR
FRANK H. LeJEUNE
BY
ATTORNEYS

March 1, 1938.  F. H. LE JEUNE  2,109,922
METHOD AND MACHINE FOR MANUFACTURING UNDERCUT SAND MOLDS
Filed May 11, 1936  2 Sheets-Sheet 2
FIG. 2.
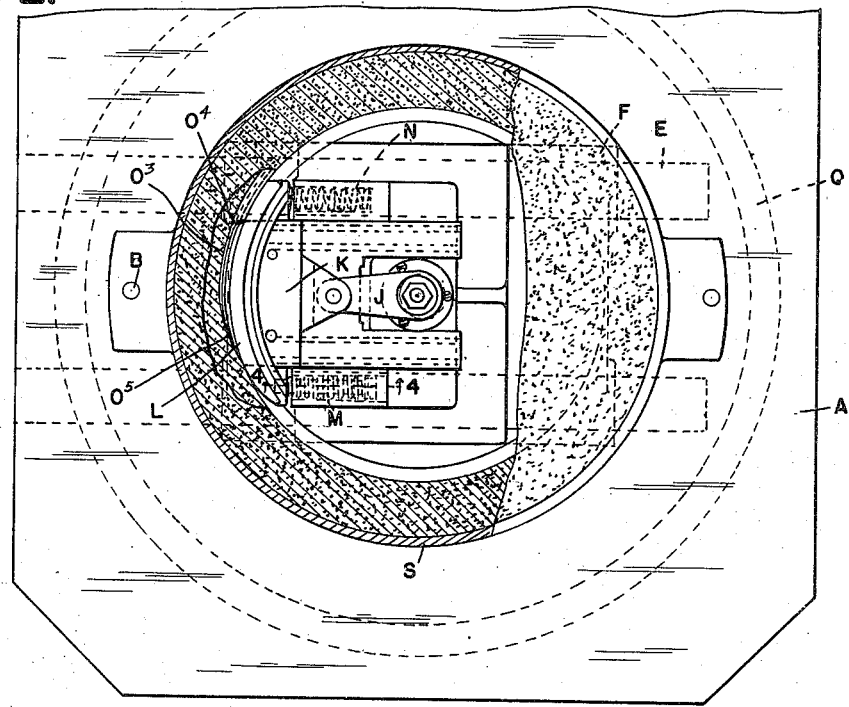
FIG. 3.
FIG. 4.
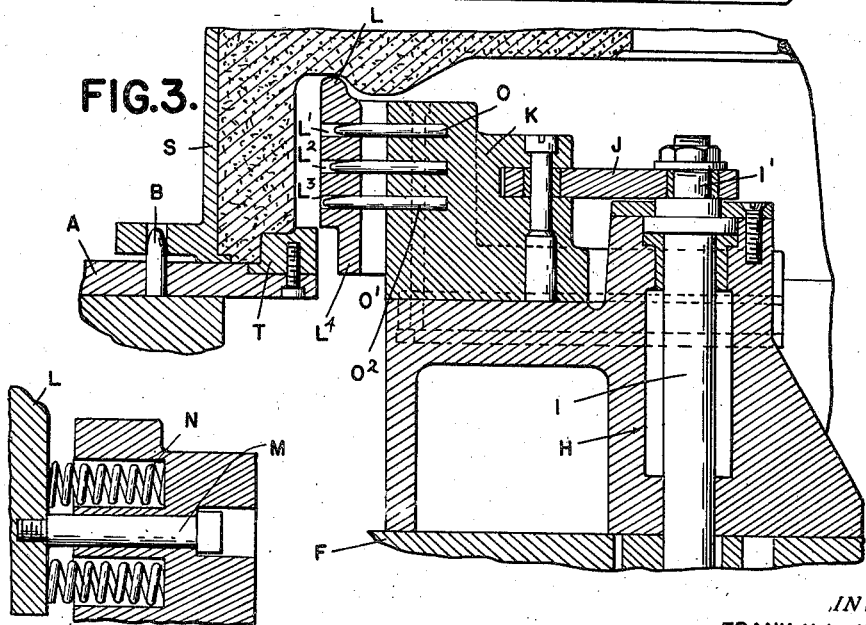
INVENTOR
FRANK H. LeJEUNE
BY Whittemore Hulbert
Whittemore & Belknap
ATTORNEYS Patented Mar. 1, 1938

2,109,922

UNITED STATES PATENT OFFICE 2,109,922

METHOD AND MACHINE FOR MANUFACTURING UNDERCUT SAND MOLDS

Frank H. Le Jeune, Detroit, Mich., assignor to Kelsey-Hayes Wheel Company, Detroit, Mich., a corporation of Delaware Application May 11, 1936, Serial No. 79,123

13 Claims. (Cl. 22—24)

The invention relates to the forming of sand molds of that type in which portions of the mold cavity are undercut and, therefore, cannot be formed by a draft pattern. In the present state of the art, various machines have been devised for forming molds of this character in all of which the main mold cavity is first formed in the sand by a draft pattern and subsequently the undercut portions are formed by cutting, rolling or other means. With my improvement the undercutting is also accomplished subsequent to the forming of the main mold cavity but is performed by a novel method and apparatus. The invention, therefore, consists in the method and apparatus as hereinafter set forth.

In the drawings:

Figure 2 is a plan view partly in section taken on the line 2—2 of Figure 1;

Figure 3 is an enlarged view similar to Figure 1 showing the parts in different position;

Figure 4 is a section on the line 4—4 of Figure 2.

Figure 1:
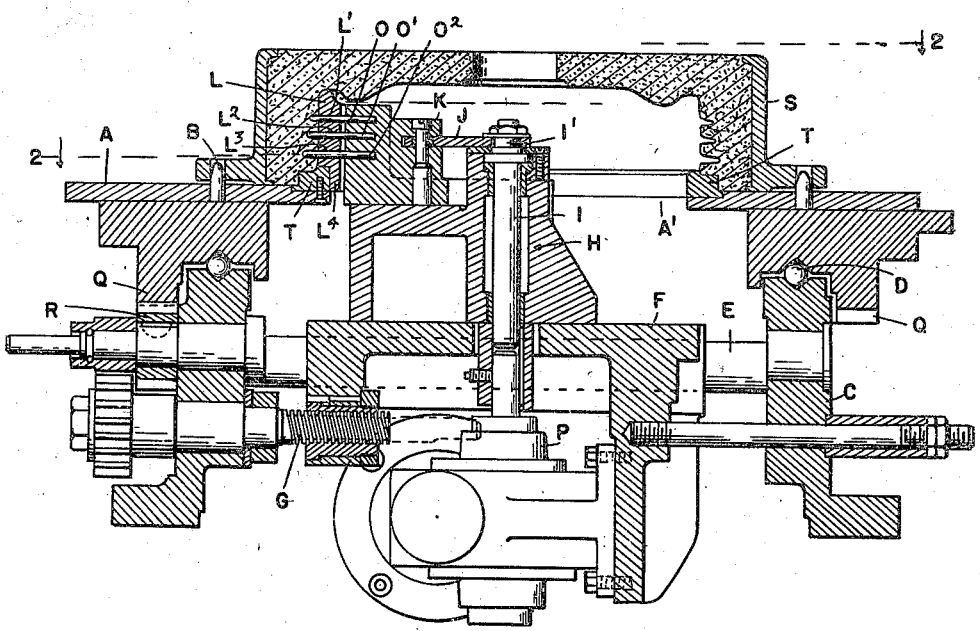
Figure 1 is a vertical central section through my improved machine showing the same in connection with a mold to be undercut.

My improved machine comprises a table or platform A adapted to receive the flask containing the preformed main mold cavity. B are guide pins on the table for engaging the flask and adapted to accurately register the same with a circular opening A' in the table. The table A is revolubly supported on an annular stationary frame C arranged beneath the same, preferably by ball bearings D engaging registering circular grooves in the table and frame. Extending across the annular frame C are guide rails E on which is supported a carriage F adapted to be adjusted on said rails by the operation of a screw G. The carriage F has an upwardly extending member H in which is journaled a vertically extending shaft I projecting upward through the aperture A' in the table. This shaft has at its upper end a crank or eccentric I' engaging a rod J which connects it with a reciprocatory member K slidably mounted on the member H and largely located above the plane of the table. At the outer end of the member K is a segmental member L the outer surface of which is a curve of substantially the same radius as the inner surface of the wall of the main mold cavity. The member L is slidably attached to the member K by headed guide pins or bolts M, and springs N yieldably hold the member L at the outer limit of the movement permitted by said headed pins. The member L is further provided with a series of slots therein L', L², L³. Slidably engaging these slots are members O, O', O² which are connected at their inner ends to the member K. With the specific construction shown, these members O, O', O² are designed to form undercut grooves in the mold, which in turn will form ribs on the casting. For this purpose, these members are of a contour in plan view, a portion O³ of which is substantially concentric to the outer surface of the member L, while on opposite ends of this portion are tapering portions O⁴ and O⁵. The portion O⁵ is of a more gradual taper than the portion O⁴ as this forms the advance end in the relative rotation of these members and the mold as will be hereinafter explained.

At the lower end of the shaft I is a casing P containing a motor and speed reducing transmission through which the shaft I is revolved at a predetermined speed to impart a reciprocatory movement to the member K and members O, O', O² attached thereto. The machine is also provided with means for rotating the table A upon the frame C, including an annular rack Q on the underside of the table and a pinion R engaging said rack and driven by a motorized mechanism (not shown).

With the construction of the machine as above described, the method of procedure in the forming of the mold is as follows:

The flask S containing the preformed sand mold is first placed upon the table A and engaged with the pins B to properly register it with the opening in the table. Surrounding this opening is preferably placed an annular member T which fits into a portion of the mold cavity and supports the sand of the mold overlying the same. At the time the flask is so positioned the carriage F has been retracted by operation of the screw G to a position where the members L, O, O', O² all clear the inner face of the mold cavity. Thus, the flask can be placed on the table without injury to the mold.

The next step in the operation is to move the carriage F radially outward by rotation of the screw G which may be accomplished by a hand crank engageable with the outer end of said screw. This will carry the member L outward until the lower end portion L⁴ thereof is arrested by contact with the ring T, this bringing the outer face of the member L into contact with the inner face of the main portion of the mold cavity. The continued outward movement of the carriage F will move the members O, O', O² through the slots L', L, L², pressing the same into the sand and forming undercut mold cavities of corresponding shape. Such continued movement of these members is permitted by reason of the yieldable springs N which are between the member L and the member H. The sand which is displaced by the members O, O', O² is forced radially outward and any distortion of the adjacent inner face of the main mold cavity is prevented by contact of the member L therewith.

The operator next starts the motor in the casing P which by rotating the shaft I imparts a reciprocatory movement to the member K and the members O, O', O² carried thereby. The motor for actuating the pinion R is next set in motion which slowly revolves the table A during the continued reciprocation of the members O, O', O². Thus, these members perform a tamping operation upon the sand in the mold, which during the rotative advance of the mold will gradually extend the undercut grooves until at the completion of a revolution these grooves will surround the main mold cavity. The rotative advance is preferably quite slow in comparison with the reciprocation of the member K so that for each reciprocation of the latter the advance will not be more than a fraction of an inch. Also, the gradually tapered portions O⁵ are at the advance end and the displacement of sand during each reciprocation at any one point is comparatively slight. This will insure the forming of the undercut mold cavities without injury to the adjacent portion of the mold and in fact will increase the strength of the mold by the further compacting of the sand. At the completion of the revolution, the screw G is again adjusted to move the carriage F radially inward which will withdraw the members O, O', O² from their engagement with the undercut portions of the mold and will also retract the member L. This will permit the operator to remove the flask from the table A and to place another flask in position thereon for a repetition of the operation.

What I claim as my invention is:

1. In the method of forming sand molds, the steps of pressing a pattern into the wall of a preformed mold cavity to form an undercut extension thereof, reciprocating said pattern to produce a tamping action on the sand and simultaneously relatively advancing the pattern along the wall of the cavity transverse to the direction of reciprocation to extend the undercut portion thereof.

2. In a method of forming sand molds, the steps of placing an apertured member adjacent to the inner surface of the wall of a preformed mold cavity, projecting a pattern member through the aperture and pressing the same into the sand to form an undercut extension of the mold cavity, imparting a reciprocatory movement to said pattern member to produce a tamping action on the sand and simultaneously relatively advancing said apertured member together with said reciprocating pattern transverse to the direction of reciprocation to extend the undercut portion of said cavity.

3. In an apparatus for forming sand molds, a support for a preformed mold, a pattern member within the mold cavity, means for adjusting said pattern member to press the same into the wall of the mold to form an undercut extension of the mold cavity, means for imparting to said pattern member a reciprocatory movement, and means for simultaneously relatively advancing said pattern member transverse to the direction of reciprocation to extend the undercut mold cavity.

4. In an apparatus for forming sand molds, a support for a preformed mold, a pattern support extending into the mold cavity, a pattern member carried thereby, means for moving said pattern support and pattern in a direction transverse to the wall of the mold to press the pattern into said wall and to form an undercut extension of the mold cavity, means for imparting a reciprocatory movement to the pattern, and means for simultaneously relatively moving said mold support and pattern support in a direction parallel to the wall of the mold and transverse to the direction of reciprocation to extend the undercut mold cavity.

5. In an apparatus for forming sand molds, a support for a preformed mold, a pattern support projecting into the mold cavity, an apertured member carried by said pattern support, a pattern extending through the aperture in said member to project beyond the same, means for relatively adjusting said mold support and pattern support to carry said apertured member adjacent to a wall of the mold cavity and to press said pattern into said wall to form an undercut extension of the mold cavity, means for imparting a reciprocatory movement to the pattern in said apertured member, and means for simultaneously relatively moving said mold support and pattern support in a direction parallel to the wall of the mold cavity and transverse to the direction of reciprocation to extend the undercut portion of the mold.

6. In an apparatus for forming sand molds, a support for a preformed circular mold, a pattern support projecting into the mold cavity, an apertured member carried by said pattern support, a pattern extending through the aperture in said member to project beyond the same, means for relatively moving said mold support and pattern support in a direction radial with respect to said circular mold to move said apertured member adjacent to the wall of the mold cavity and to press said pattern into the mold to form an undercut extension of the mold cavity, means for imparting a reciprocatory movement to said pattern to provide a tamping action, and means for relatively rotating said mold support and pattern support concentric with said circular mold and transverse to the direction of reciprocation to extend the undercut mold cavity completely around the mold.

7. In an apparatus for forming sand molds, comprising a supporting frame, an annular table rotatably mounted on said frame concentric with the axis of rotation, means for accurately positioning on said table a mold having a circular mold cavity concentric with the axis of rotation, a carriage supported on said frame to extend upward into said mold cavity and movable in a direction radial with respect to said mold, an apertured member on said carriage adjustable therewith to be adjacent to the wall of the mold cavity, a pattern member extending through said aperture to project beyond the same and to be pressed by the movement of said carriage into the wall of the mold to form an undercut extension of the mold cavity, means for imparting to said pattern a reciprocatory movement, and means for simultaneously rotating said table transverse to the direction of reciprocation to extend the undercut mold cavity by the tamping action of said pattern.

8. An apparatus for forming sand molds comprising a supporting frame, an annular table revolubly mounted on said frame concentric with its axis of rotation, means for accurately positioning on said table a preformed mold having a circular mold cavity concentric with the axis of rotation, a carriage mounted on said frame to be movable in a radial direction with respect to said mold and extending upward into the mold cavity, an apertured member mounted on said carriage and movable therewith into proximity to the wall of the mold cavity, a pattern extending through the aperture in said member to project beyond the same, said pattern having a portion concentric with the axis of rotation, and an advance portion tapering radially inward, means for imparting a reciprocatory movement to said pattern in said apertured member, and means for simultaneously rotating said table in a direction rearwardly relative to said pattern and transverse to the direction of reciprocation whereby an undercut mold cavity will be progressively formed by the tamping action of said pattern.

9. An apparatus for forming sand molds comprising a supporting frame, an annular table rotatably mounted on said frame concentric with the axis of rotation, means for accurately positioning on said table a mold having a circular mold cavity concentric with the axis of rotation, a carriage mounted on said frame to extend upward into said mold cavity, said carriage being movable radially with respect to said mold, a pattern on said carriage, means for imparting to said pattern a reciprocatory movement in a radial direction with respect to said mold, an apertured member through which said pattern projects, said member being mounted on said carriage to be resiliently yieldable in a radial inward direction, an annular member on said carriage projecting into the mold cavity adjacent to the wall of the mold, said member forming a limiting stop for the outward movement of said apertured member when the outer face thereof is adjacent to the wall of the mold cavity but permitting the continued outward movement of said pattern to form an undercut extension of the mold cavity, and means for rotating said table simultaneously with the reciprocation of said pattern transverse to the direction of reciprocation to extend said undercut mold cavity by a progressive tamping action of said pattern.

10. In an apparatus for forming sand molds, a support for a mold having a preformed cavity, a pattern member within the mold cavity, means for adjusting said pattern member toward the wall of the mold and to a position providing for engagement of said pattern member with the wall to form an undercut extension of the mold cavity, means for imparting to said pattern member a reciprocatory movement to produce a tamping action on the wall and thereby form the undercut extension, and means for simultaneously advancing in a direction transverse to the reciprocation successive portions of the wall relative to said pattern member.

11. In the method of forming a sand mold with an undercut extension, the steps of tamping an undercut extension in a portion of a preformed mold by subjecting the same to a series of impacts and simultaneously subjecting successive portions of the mold in a direction transverse to the impacts to the tamping to increase the length of the undercut extension.

12. In the method of forming sand molds, the steps of tamping by a series of impacts a portion of the sand of the wall of a preformed mold cavity to form an undercut extension, and simultaneously subjecting successive portions of the wall in a direction transverse to the impacts to the tamping to increase the length of the undercut extension.

13. In the method of forming sand molds, the steps of advancing a pattern toward the wall of a preformed mold cavity to a position providing for engagement of the pattern with the wall to form an undercut extension of the mold cavity, reciprocating the pattern to produce a tamping action on the sand of the wall and thereby form the undercut extension, and during the reciprocating subjecting successive portions of the wall in a direction transverse to the reciprocation to the tamping action to increase the length of the undercut extension.

FRANK H. LE JEUNE.